United States Patent
Paragios et al.

(10) Patent No.: US 10,460,491 B2
(45) Date of Patent: Oct. 29, 2019

(54) METHOD FOR REAL-TIME DEFORMABLE FUSION OF A SOURCE MULTI-DIMENSIONAL IMAGE AND A TARGET MULTI-DIMENSIONAL IMAGE OF AN OBJECT

(71) Applicant: CENTRALESUPELEC, Gif sur Yvette (FR)

(72) Inventors: Nikos Paragios, Paris (FR); Singht Bharat, Hyattsville, MD (US); Stavros Alchatzidis, Melun (FR)

(73) Assignee: CENTRALESUPELEC, Gif sur Yvette (FR)

( * ) Notice: Subject to any disclaimer, the term of this patent is extended or adjusted under 35 U.S.C. 154(b) by 0 days.

(21) Appl. No.: 15/554,649

(22) PCT Filed: Mar. 26, 2015

(86) PCT No.: PCT/IB2015/000546
§ 371 (c)(1),
(2) Date: Aug. 30, 2017

(87) PCT Pub. No.: WO2016/151352
PCT Pub. Date: Sep. 29, 2016

(65) Prior Publication Data
US 2018/0040152 A1 Feb. 8, 2018

(51) Int. Cl.
*G06T 11/60* (2006.01)
*G06T 7/35* (2017.01)
(Continued)

(52) U.S. Cl.
CPC .............. *G06T 11/60* (2013.01); *G06T 7/35* (2017.01); *G06T 7/37* (2017.01); *G06T 7/70* (2017.01);
(Continued)

(58) Field of Classification Search
CPC ... G06T 11/60; G06T 7/70; G06T 7/37; G06T 7/35; G06T 2207/10132;
(Continued)

(56) References Cited

U.S. PATENT DOCUMENTS 7,139,409 B2 * 11/2006 Paragios ............ G06K 9/00778
382/103
7,925,117 B2 * 4/2011 Hamza ...................... G06T 7/35
382/294

(Continued)

FOREIGN PATENT DOCUMENTS

WO 2012/123505 A2 9/2012

OTHER PUBLICATIONS

Xu, M., et al., "An Image Fusion Approach Based on Markov Random Fields," IEEE Transactions on Geoscience and Remote Sensing, vol. 49, No. 12, Dec. 2011, pp. 5116-5127.*

(Continued)

*Primary Examiner* — Xuemei G Chen
(74) *Attorney, Agent, or Firm* — Duane Morris LLP (57) ABSTRACT

The invention concerns a method for deformable fusion of a source multi-dimensional image (s(x)) and a target multi-dimensional image (t(x)) of an object, each image being defined on a multi-dimensional domain by a plurality of image signal samples, each sample having an associate position in the multi-dimensional domain and an intensity value, the method comprising estimating a smooth deformation field (d(x)) that optimizes a similarity criterion between the source image and the target image using a Markov Random Field framework, in near real-time performance. The similarity criterion is computed on transform coefficients obtained by applying a sub-space hierarchical transform to the image samples of the target image and to image samples obtained from the source image, an optimal (Continued)

tradeoff between a smoothness condition and the similarity criterion being automatically determined.

17 Claims, 2 Drawing Sheets

(51) Int. Cl.
*G06T 7/37* (2017.01)
*G06T 7/70* (2017.01)

(52) U.S. Cl.
CPC .............. *G06T 2207/10028* (2013.01); *G06T 2207/10081* (2013.01); *G06T 2207/10088* (2013.01); *G06T 2207/10132* (2013.01); *G06T 2207/20021* (2013.01); *G06T 2207/20064* (2013.01); *G06T 2207/20072* (2013.01); *G06T 2207/30004* (2013.01)

(58) Field of Classification Search
CPC . G06T 2207/10088; G06T 2207/10081; G06T 2207/10028; G06T 2207/20021; G06T 2207/30004; G06T 2207/20072; G06T 2207/20064
USPC .......................... 345/418; 382/103, 165, 294
See application file for complete search history.

(56) References Cited

U.S. PATENT DOCUMENTS

| | | | | |
|---|---|---|---|---|
| 8,126,291 | B2* | 2/2012 | Paragios | G06K 9/32 382/294 |
| 8,131,069 | B2* | 3/2012 | Komodakis | G06K 9/6297 382/165 |
| 8,890,862 | B2* | 11/2014 | Paragios | G06K 9/00973 345/418 |
| 9,262,836 | B2* | 2/2016 | Cao | H04N 1/387 |
| 9,418,468 | B2* | 8/2016 | Paragios | G06T 15/005 |

OTHER PUBLICATIONS

Stavros Alchatzidis, Aristeidis Sotiras, Nikos Paragios. Efficient parallel message computation for MAP inference. International Conference on Computer Vision, Nov. 2011, Barcelone, Spain. pp. 1379-1386, 2011.

Singh, B. et al., "Quasi real-time sub-space 3D deformable fusion", Feb. 26, 2015 (Feb. 26, 2015), pp. 1-4, XP055237234, Retrieved from the Internet: URL: https://web.archive.org/web/ 20150226113458// http:www.cs.umd.edu/-bharat/isbi_registration. pdf [retrieved on Dec. 17, 2015].

Ferrante E. et al., "Non-rigid 2D-3D medical image registration using markov random fields", International Conference on Medical Image Computing and Computer-Assisted Intervention, Jan. 1, 2013 (Jan. 1, 2013), pp. 163-170, XP055237621, Germany, Retrieved from the Internet: URL:https://hal.archives-ouvertes.fr/hal-00855662v2/document [retrieved on Dec. 17, 2015].

Jue Wu et al., "Multimodal Brain Image Registration Based on Wavelet Transform Using SAD and MI", In: Grid and cooperative computing—GCC 2004: Third international conference, Wuhan, China, Oct. 21-24, 2004IN: Lecture notes in computer science, ISSN 0302-9743, vol. 3251, Jan. 1, 2004 (Jan. 1, 2004), Springer Verlag, DE 032548, XP055237623, pp. 270-277.

Hina Shakir, "Multimodal Medical Image registration using Discrete Wavelet Transform", Journal of Independent Studies and Research—Computing Volume, vol. 11, No. 1, Jan. 1, 2013 (Jan. 1, 2013), XP055237625, pp. 29-34.

Aristeidis Sotiras et al., "Deformable Medical Image Registration: A Survey", IEEE Transactions on Medical Imaging, IEEE Service Center, Piscataway, NJ, US, vol. 32, No. 7, Jul. 1, 2013 (Jul. 1, 2013), pp. 1153-1190, XP011516362.

International Search Report issued for International patent application No. PCT/IB2015/000546, dated Jan. 27, 2016, 3 pages.

* cited by examiner

METHOD FOR REAL-TIME DEFORMABLE FUSION OF A SOURCE MULTI-DIMENSIONAL IMAGE AND A TARGET MULTI-DIMENSIONAL IMAGE OF AN OBJECT

CROSS-REFERENCE TO RELATED APPLICATIONS

The present application is a United States national stage application under 35 U.S.C. § 371 of international patent application number PCT/IB2015/000546, filed Mar. 26, 2015, the entirety of which is incorporated herein by reference.

BACKGROUND OF THE INVENTION

The present invention concerns method for sensibly real-time deformable fusion of a source multi-dimensional image and a target multi-dimensional image of an object.

The field of the invention is the field of multi-dimensional image fusion, the images being either of same modalities or of different modalities of image acquisition.

In particular, the invention concerns three-dimensional (3D-3D) image fusion.

The 3D-3D mono-modal and multi-modal image fusion finds applications in multiple medical procedures, such as biomedical image analysis, adaptive radiotherapy treatment, spinal surgery, hip replacement, neuro-interventions and aortic stenting in particular when "real-time" performance is considered.

Various modalities include computed tomography (CT), radiography, magnetic resonance, ultrasound.

Deformable fusion, which is one of the greatest challenges in medical imaging, seeks the estimation of a smooth deformation field that optimizes a similarity criterion between the source image and the target image.

In the multi-modal case, the definition of an appropriate similarity metric between images is particularly difficult, since intensity variations between a source image and a target image are unknown and may be particularly large and highly non-linear.

Moreover, deformable fusion is problematic because it is difficult to use known methods, such as statistical based methods, to estimate local densities of probability to define a local similarity criterion.

Modality specific methods have been proposed. Such methods rely on the segmentation of objects of interest, such as organs or tissues, in each modality, and therefore the quality of segmentation is key to their efficiency. Moreover, a prior knowledge of the physical laws that relate the intensities between modalities is necessary which diminishes the applicability of such a methods in a more generic setting.

Some known methods are based on defining an appropriate metric after training on training data sets. Therefore, these methods lack of generalization in terms of modalities to be handled as well as in terms of data/objets of interest not seen during training.

Once the similarity criterion has been appropriately defined, it has to be combined with smoothness penalty towards overcoming the ill-posedeness of the estimation problem. The importance of the smoothness constraint could have a tremendous impact on the quality of the obtained solution ranging from oversmoothing of the deformation (which is often equivalent with inability of capturing important organ deformations) to meaningless deformation models (under smoothing) where established correspondences do not have meaningful anatomical interpretations.

Last, but not least, the adoption/use of deformable multi-modal fusion methods in clinical setting is constrained by their computational complexity (running time). Despite tremendous progress made over the past decade in terms of computing resources, none of the existing state of the art methods meet close to real-time performance unless highly dedicated and considerably expensive architectures are considered. Towards addressing this need most of the effort was invested to take advantage of computing power with respect to existing methods and not developing new methods when once considered with modern parallel architectures could lead to near real-time performance.

An aim of the present invention is to provide an elastic/deformable fusion method that overcomes the cited drawbacks.

SUMMARY OF THE INVENTION

To this end, the invention concerns, according to a first aspect, a method for deformable fusion of a source multi-dimensional image and a target multi-dimensional image of an object, each image being defined on a multi-dimensional domain by a plurality of image signal samples, each sample having an associate position in the multi-dimensional domain and an intensity value, the method comprising estimating a smooth deformation field that optimizes a similarity criterion between the source image and the target image using a Markov Random Field framework, in near real-time performance. The method is characterized in that the similarity criterion is computed on transform coefficients obtained by applying a sub-space hierarchical transform to the image samples of the target image and to image samples obtained from the source image, an optimal tradeoff between a smoothness condition and the similarity criterion is automatically determined.

Advantageously, the invention provides a sensibly "real-time" elastic fusion method using Markov Random Fields, based on a similarity criterion that is robust to changes of image intensities between modalities, which does not require any prior knowledge while at the same time automatically determines the optimal balance between smoothness and desired visual correspondences Advantageously, the method proposed is faster than known methods.

According to various embodiments, the method of the invention comprises the following features, taken in any technically allowable combination.

The method comprises the steps of:
defining a Markov Random Field framework comprising an undirected pairwise graph superimposed on the image domain defining a grid of control points, and an associate neighborhood system, each control point having an associate support sub-domain,
obtaining a set of multi-dimensional labels of a discrete space to associate to each control point, wherein a displaced control point is obtained by assigning a given label to said control point,
obtaining a set of labels optimizing an energy target function, the energy target function comprising a first data term computed as a sum, over the control points, of unary potentials depending on said similarity criterion metric computed using transform coefficients of the target image and transform coefficients of displaced points of the source image.

The energy target function is a sum of said first data term and a second smoothness term, said smoothness term being dependent on a distance computed between displaced control points, according to a predetermined neighborhood.

The similarity metric is computed, for each control point, on the support sub-domain associated to the control point, as a sum of a difference, on each point of the support sub-domain, between the logarithm of the transform coefficient of the displaced source image and the logarithm of the transform coefficient of the target image and a constant value.

The similarity metric is computed, for each control point, on the support sub-domain associated to the control point, as a sum of a difference, on each point of the support sub-domain, between the logarithm of the transform coefficient of the displaced source image weighted by a non-linear exponential constant value and the logarithm of the transform coefficient of the target image, and a constant value.

The step of obtaining a set of labels optimizing an energy target function is implemented using a variant loopy belief propagation algorithm.

The sub-space hierarchical transform is a discrete Haar wavelet transform.

According to a second aspect, the invention concerns a programmable device for deformable fusion of a source multi-dimensional image and a target multi-dimensional image of an object, each image being defined on a multi-dimensional domain by a plurality of image signal samples, each sample having an associate position in the multi-dimensional domain and an intensity value, the deformable fusion comprising estimating a smooth deformation field that optimizes a similarity criterion between the source image and the target image using a Markov Random Field framework, in near real-time performance.

The programmable device comprises means for computing the similarity criterion on transform coefficients obtained by applying a sub-space hierarchical transform to the image samples of the target image and to image samples obtained from the source image, so as to automatically determine an optimal tradeoff between a smoothness condition and the similarity criterion.

The advantages of the device of the invention are analogous to the advantages of the method of the invention briefly introduced above.

According to an embodiment, the programmable device comprises means for:
  defining a Markov Random Field framework comprising an undirected pairwise graph superimposed on the image domain defining a grid of control points, and an associate neighborhood system, each control point having an associate support sub-domain,
  obtaining a set of multi-dimensional labels of a discrete space to associate to each control point, wherein a displaced control point is obtained by assigning a given label to said control point,
  obtaining a set of labels optimizing an energy target function, the energy target function comprising a first data term computed as a sum, over the control points, of unary potentials depending on said similarity criterion metric computed using transform coefficients of the target image and transform coefficients According to a third aspect, the invention concerns a non-transitory program storage device readable by a processing system, tangibly embodying a program of instructions executed by the processing system to perform the method steps for deformable fusion of a source multi-dimensional image and a target multi-dimensional image of an object.

The advantages of the non-transitory program storage device of the invention are analogous to the advantages of the method of the invention briefly introduced above.

According to a fourth aspect, the invention concerns a computer program comprising instructions for implementing the steps of a method for deformable fusion of a source multi-dimensional image and a target multi-dimensional image of an object as briefly described above, when the program is executed by a processor of a programmable device.

BRIEF DESCRIPTION OF THE DRAWINGS

The invention will be better understood in the light of the detailed description and accompanying drawings listed below, which are only exemplary and by no way limiting.

DETAILED DESCRIPTION OF THE PREFERRED EMBODIMENTS

The invention is described in the context of medical imaging, considering a source image $s(x)$ and a target image $t(x)$.

The aim of the invention is to find a smooth non-linear deformation field between the source image and the target image.

These source and target images are, in an embodiment, of different modalities. However, the invention also applies to images of same modality.

In an embodiment, the source and target images are 2D images.

Alternatively, source and target images of higher dimensionalities are processed.

Each image is defined by a plurality of image samples or pixels, having an associate position in a multi-dimensional support domain and an associate image signal value, also called intensity value.

A similarity metric between the source and the target images, defining content similarity between the source image signal and the target image signal, denoted $\rho(s(x),t(x))$, is defined.

Advantageously, the invention provides a similarity metric $\rho(s(x),t(x))$ that is robust to illumination changes, so it is well adapted to source and target images of different modalities.

In general terms, the optimal fusion refers to a deformation transformation $d(x)$ that minimizes an image-driven term and a regularization term on a deformation space $\Omega$, which is the image support domain:

$$d = \operatorname{argmin} \int_\Omega \rho(s(d(x)), t(x))dx + \alpha \int_\Omega \phi(\nabla d(x))dx \quad (1)$$

In equation (1), the regularization term is expressed as a function of $\phi(\nabla d(x))$ which usually is a monotonically increasing function of the norm of the deformation derivative and α is a control weighting factor, controlling the amount of deformation allowed.

According to an embodiment, the support domain Ω is partitioned into sub-domains, where adjacent sub-domains may overlap: $\Omega=\{\Omega_1, \ldots, \Omega_n\}$. The union of the sub-domains covers the support domain Ω. Such sub-domains are defined automatically using a uniform partition of the entire domain.

In the preferred embodiment of the invention, it is assumed that the source image and the target image are related, given the optimal deformation transformation d(x), by a piece-wise constant liner transport function on each sub-domain:

$$x \in \Omega_i: s(d(x))=a_i t(x)+b_i \quad (2)$$

where $a_i$ and $b_i$ are the transport coefficients for sub-domain $\Omega_i$.

The deformable fusion problem can be seen as a coupled inference process that aims at optimally determining the image partition sub-domains, the transport coefficients and the deformation transformation d(x):

$$\min_{n, a_i, b_i, \Omega_i, d} \sum_{i=1}^{n} \left\{ \int_{\Omega_i} \rho(s(d(x)), a_i t(x)+b_i) dx \right\} + \alpha \int_{\Omega} \phi(\nabla d(x)) dx \quad (3)$$

In an embodiment of the invention, a grid like representation is used.

Figure 1:
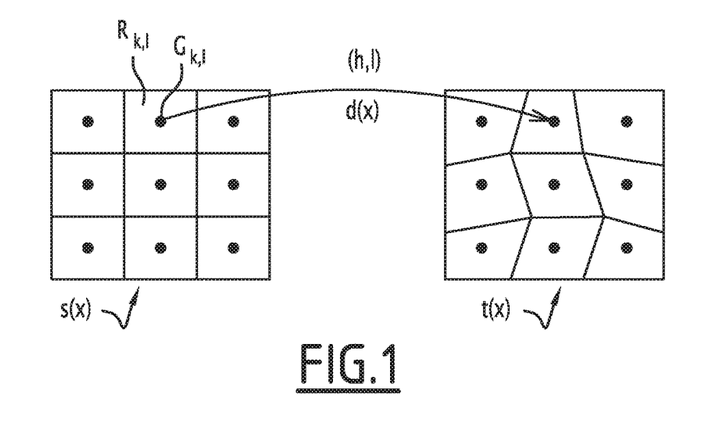
FIG. 1 schematically illustrates a source image and a target image to which the method of deformable fusion applies.

As showed schematically in FIG. 1 for two-dimensional source and target images, a grid-like structure, composed of grid nodes, also referred to as control points, $G_{k,l}(k,l)$, $(k,l) \in [1, K] \times [1, L]$ is superimposed on each image to process.

The deformation transformation d(x) of a given pixel is expressed as a parameterized function, for example a cubic B-spline interpolation, of the displacements of the "adjacent" grid nodes.

Using a cubic B-spline has the advantage of reducing significantly the number of degrees of freedom of the deformation transformation d(x), guarantees the smoothness of the deformation field and provides a natural partition of the image domain.

Each control point $G_{k,l}(k,l)$ is endowed with a rectangular domain support $R_{k,l}$ that is centered on the control point. A rectangular domain support $R_{k,l}$ actually corresponds to a sub-domain $\Omega_i$ of the image support domain Ω.

The fusion problem of equation (3) can be expressed as:

$$\min_{a_{k,l}, b_{k,l}, d_{k,l}} \sum_{k=1}^{K} \sum_{l=1}^{L} \left\{ \int_{R_{k,l}} \rho(s(d(x)), a_{k,l} t(x)+b_{k,l}) dx \right\} + \alpha \int_{\Omega} \phi(\nabla d(x)) dx \quad (4)$$

The number of sub-domains $R_{k,l}$ is predetermined, as well as their corresponding integrals.

Advantageously, the deformation model is considered in a hierarchical manner, using a similarity metric ρ(s(x),t(x)) defined hierarchically, in a coarse-to-fine manner.

In the preferred embodiment, the similarity metric is defined on an appropriate sub-space of representation of the source image and of the target image, namely the wavelet coefficients sub-space.

In order to simplify the explanation, without loss of generality, the definition of the similarity metric is explained hereafter in a one-dimensional (1D) space.

The wavelet transformation being separable with respect to the dimension, the generalization of the similarity metric to higher representation spaces is straightforward for a person skilled in the art.

Therefore, considering 1D source and target signals, a 1D control point $G_k$ having a corresponding support $R_k$ is considered in the source s(x).

The intensity distribution of the source control point is given by s(d(x)). The corresponding intensity distribution of the corresponding patch in the target signal t(x) is given by $a_k t(x)+b_k$, according to equation (2).

The method of the invention aims at defining a similarity metric that provides a similarity criterion that is minimized when the source signal s(x) and the target signal t(x) are aligned, irrespective of $a_k, b_k$. Such a similarity metric is robust to intensity changes dues to the fact that the source signal and the target signal arise from different modalities.

Therefore, an optimal tradeoff between smoothness conditions and the similarity criterion is automatically determined.

The source signal and the target signal are defined in the discrete domain, and comprise N samples, or, in other words, have discrete size N.

In general, for a signal $f[i], i \in [0, N]$, the discrete Haar wavelet transform is defined as:

$$\text{dwt}[i] = \frac{f[2i]+f[2i+1]}{\sqrt{2}}, 0 \le i < \frac{N}{2} \quad (5)$$

$$\text{dwt}[i] = \frac{f[2i-N]+f[2i+1]-N}{\sqrt{2}}, \frac{N}{2} \le i < N \quad (6)$$

Where dwt[i] are the first-level coefficients of the input signal f. Equation (5) expresses the lower frequency coefficients.

A hierarchical representation of the signal f is obtained by recursively applying the discrete Haar transform on the lower frequency transform signal given by the coefficients of equation (5). At each iteration, the size of the lower frequency signal is divided by 2.

The recursive application of the discrete Haar transform is applied until the size of the lower frequency signal is equal to one.

In such a representation of the signal f, all the coefficients, other than the first one, comprise a local difference of intensities in the input signal at various scales.

When such a wavelet transform is applied to a source signal related to a target signal by a piecewise linear representation as explained above, the transport coefficient $a_k$ is scaled and the transport coefficient $b_k$ is cancelled.

Applying the discrete wavelet transform described above to the source signal taking into account the deformation transformation, s(d(x)), and to the target signal t(x), leads to wavelet transform coefficients s'(d(x)) and t'(x) respectively.

If there exists a linear relationship between the intensities of the source and target images, the relationship is propagated in the wavelet coefficients in any dimension as:

$$s'(d(x))=a_k t'(x) \quad (7)$$

Taking the magnitude of the coefficients and applying the logarithm, the following formula is obtained:

$$\log(|s'(d(x))|)=\log(|t'(x)|)+\log(a_k) \quad (8)$$

Using this property, the similarity metric is defined as:

$$\rho(s(d(x)), t(x)) = \frac{1}{N}\sum_{i=1}^{N}(\log(|s'(d(x))|) - \log(|t'|(x)) - \log(a_k)) \quad (9)$$

where the summation is applied on all the coefficients of the support of the considered sub-domain $\Omega_k$.

The factor due to the linear intensity variation appears as a constant $\log(a_k)$ instead of a multiplicative factor in the similarity metric defined above.

In practice, this constant is small compared to the scale of the signals and is spatially stationary of a sub-domain $\Omega_k$.

Hence, it does not alter the nature of the distribution of the similarity metric.

It is to be noted that the discrete Haar transform is used as an example, but other discrete wavelet transforms may be applied using different basis. The advantage of the Haar transform lies on its computational efficiency.

In a variant of the invention, the changes between the intensities of the image modalities are not modeled by a linear relationship, but by a non-linear exponential relationship between the wavelet coefficients:

$$s'(d(x))^{\gamma_k} = a_k t'(x) \quad (10)$$

where $\gamma_k$ is the exponential variation in the wavelet coefficients.

To compensate for this non-linear change, the similarity metric is defined as:

$$\rho'(s(d(x)), t(x)) = \frac{1}{N}\sum_{i=1}^{N}(c_k \cdot \gamma_k \cdot \log(|s'(d(x))|) - \log(|t'|(x)) - \log(a_k)) \quad (11)$$

where $\rho'$ is the joint distribution of the similarity metric with the non-linear exponential constant $c_k$, and the summation is applied on all the coefficients of the support of the considered sub-domain $\Omega_k$.

In order to find the optimal deformation transformation $d(x)$ to solve the fusion problem, the fusion/registration problem is reformulated as a discrete labeling problem.

A first set of discrete labels $L=\{l_1, \ldots, l_i\}$ is defined, corresponding to a quantized version of a deformation space $\theta=\{d^1, \ldots, d^i\}$, representing the values that may be taken by the deformation of a point of a discrete grid superimposed on the image.

A point of the image support domain to which the deformation transformation is applied is also called a displaced point.

Let a second label set: $\otimes=\{\omega^1, \ldots, \omega^j\}$, corresponding to a quantized version of the non-linear transform coefficient $c_k$, $\Gamma=\{\gamma^1, \ldots \gamma^j\}$.

The discretization steps respectively used to obtain the first set of discrete labels $L=\{l_1, \ldots, l_i\}$ and the second set of discrete labels $\otimes=\{\omega^1, \ldots, \omega^j\}$ are parameters of the method, and can be chosen by a user.

A label is assigned to each control point, a position vector of a control point being denoted p, of the grid, denoted G, superimposed on the image.

Therefore, the deformation transformation $d^{l_p}=d(p)$ of a control point p is directly computed via the label $l_p$.

A dense deformation field is computed as:

$$D(x) = \sum_{p \in G} \eta(|x-p|)d^{l_p} \quad (12)$$

where $\eta$ is a projection function used to interpolate the deformation on the control points. x is a point in the source image s(x), p is the position vector of a control point, $d^{l_p}$ is a displacement vector of control point p defined by the associated label $l_p$.

In this context, the fusion problem (1) can be formulated as a labelling problem, which can be efficiently solved using Markov Random Fields (MRF).

U.S. Pat. No. 8,131,069 B1 describes a system and method for determining an optimal labeling of pixels, and patent U.S. Pat. No. 8,126,291 B1 describes a system and method for dense image registration using Markov Random Fields and efficient linear programming.

In the Markov Random Field framework, the grid G of control points is considered as an undirected pairwise graph superimposed on the image domain, and an associate neighborhood system between neighbouring control points is also defined.

An MRF (Markov Random Field) energy target function to be minimized, to solve the deformable fusion problem defined by equation (1), is given by the following formula:

$$E_{MRF}(l, w) = \sum_{p \in G} V_p(l_p, w_p) + \sum_{p \in G}\sum_{q \in N(G)} V_{pq}(l_p, l_q) \quad (13)$$

where G is the grid of control points, and N(G) the first order neighbourhood of control points forming cliques of control points.

The first term of the energy target function $E_{MRF}$ (l, w) is a first order data term and the second term of equation is a second order term, also called pairwise term.

In the MRF framework, the first term based on unary the potential $V_p$ ( ) encodes a data similarity criterion, whereas the second term $V_{pq}$ ( ) encodes neighborhood smoothness.

According to the invention, the similarity criterion is computed using the similarity metrics of formulas (9) or (11).

In a first embodiment, a linear relationship between the intensities of the source image and the intensities of the target image is considered.

In this first embodiment, the unary potential $V_p$( ) is defined by:

$$V_p(l_p) = \int_{\Omega_p} \rho(s(d^{l_p} + x), t(x))dx \quad (14)$$

where $\Omega_p$ is the sub-domain centered on control point p, $\rho$ is the similarity metric of equation (9).

In a second embodiment, considering a non-linear relationship between the intensities of the source image and the intensities of the target image, the unary potential $V_p$ ( ) is defined as:

$$V_p(l_p, w_p) = \int_{\Omega_p} \rho'(s(d^{l_p} + x), t(x), \gamma^{w_p})dx \quad (15)$$

Where $\Omega_p$ is the sub-domain centered on control point p, ρ' is the similarity metric of equation (11), using the second set of discrete labels.

In an embodiment, the second term of equation (13) can be approximated by any pairwise term penalizing displacements of neighboring control points that increase the norm of the gradient of the deformation field. In practice, discontinuity preserving functions are preferred to avoid oversmoothing. One such function is the truncated quadratic potential defined as:

$$V_{pq}(l_p,l_q) = \min(\lambda_{pq}(d^{l_p}-d^{l_q})^2, t_{pq}) \qquad (16)$$

Where $d^{l_p}$ and $d^{l_q}$ are respective position vectors of displaced control points, and $\lambda_{pq}$ is a weighting factor determining the degree of desired smoothness and $t_{pq}$ is the truncation coefficient.

A higher value of $\lambda_{pq}$ would lead to a rigid transformation, whereas a lower value will allow more deformation. Appropriate value of $\lambda_{pq}$ depends on the application and also on the similarity measure used.

Other functions such as an absolute value difference function may be used instead of a truncated quadratic function to approximate the second term of the energy target function (13).

In order to impose local-consistency on the non-linearity correction, it may be useful to impose on the pairwise term $V_{pq}(l_p,l_q)$ a Potts-like model between the distance of the retained points. However, due to the robustness of the similarity metric and to its hierarchical nature, such a constraint is not necessary.

In a variant of the method and in order to speed up computation, a calculation of the non-linearity correction before the optimization phase has been considered and shown to work. In this case, the local non-linear correction coefficient is computed as the $\gamma_k$ that minimizes the similarity function over a sub-domain around a control point when comparing the target against the source image deformed by the composite transformation found at this point. Consequently, the label set considered for the following optimization is restricted to $L=\{l_1, \ldots l_i\}$.

The MRF energy target function is optimized using Markov Random Fields.

In the preferred embodiment, the Hierarchical Loopy Belief Propagation (LBP) algorithm is used.

The hierarchical LBP process begins from the initial MRF problem (13) to create a coarser problem. The process iterates creating a hierarchy of problems, each being a more constrained version of the initial one.

Afterwards, starting with the coarser graph, a solution is found using the LBP algorithm. This solution is used to initialize the next graph in the hierarchy and the process re-iterates until the initial MRF problem is reached.

Advantageously, the number of necessary LBP iterations to reach a solution is greatly reduced.

In order to further optimize the process, an implementation on a parallel architecture is preferred, using a GPU implementation. Each iteration of the optimization process is prone to parallelization. The method for computing messages in the LBP process used is preferably the method described in the article "Efficient parallel message computation for MAP inference" by Alchatzidis et al, published in 2011 IEEE International Conference on Computer Vision (ICCV), 2011, pages 1379 à 1386.

Preferably, the method described and claimed in patent application WO2012/123505 A2 shall be used.

This method is a generic message passing scheme for MAP inference on Markov Random Fields. The method builds upon casting message computation as a weighted distance transform to propose a parallel computation scheme suitable for massively parallel architectures as those encountered in modern graphical processing units.

In particular, in the case of three-dimensional source and target images, the quadratic potential defined in equation (15) is decomposed as:

$$V_{pq}(l_p,l_q) = \min((\lambda_{pq}(d_x^{l_p}-d_x^{l_q})^2 + \lambda_{pq}(d_y^{l_p}-d_y^{l_q})^2 + \lambda_{pq}(d_z^{l_p}-d_z^{l_q})^2, t_{pq}) \qquad (17)$$

where the indexes (x, y, z) designate the respective dimensions in the 3D space.

Advantageously, a parallel implementation can then be applied in each dimension.

Figure 2:
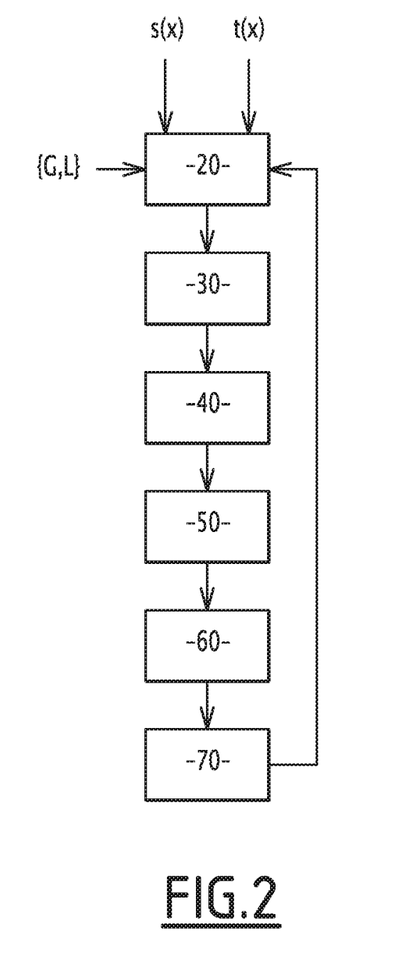
FIG. 2 is a flowchart of an embodiment of a deformable fusion method according to the invention.

FIG. 2 is a flowchart of a method for deformable fusion of a source multi-dimensional image and a target multi-dimensional image of an object according to an embodiment of the invention.

The flowchart of FIG. 2 shows a the process with given source s(x) and target t(x), which are multidimensional, for example 3D.

The parameters that are also inputs of the method at a given iteration are the grid of control points defining the number of control points, their associated positions and the support domain associated to each control point. Further, the discretization of the first and second label spaces is also an input parameter. A too small number of labels may not capture an optimal deformation whereas a too large number of labels leads to computational difficulties.

Therefore, several optimization cycles are performed, the spacing of different labels from a given iteration t−1 to a following iteration t being reduced by a factor to capture finer displacements.

Then the grid G of control points and related support domains, as well as the first set of labels L, and optionally the second set of labels ⊗ are obtained in step 20 for the current iteration t.

Then, for each point p and for each label of L, the data terms are computed.

First, for each label of L and for each support domain of a control point, the wavelet transform is applied in step 30 on the target image and on the source image after deformation on the support domain.

For the target image the coefficients are estimated once. For the source image coefficients are computed after every iteration once it has been deformed with the composite transformation up to this point.

Then in step 40, the unary potential on the support domain of the control point is computed, taking into account the previous iteration t−1, if any, using the similarity metric based on the wavelet coefficients.

According to a first embodiment, in step (40), the unary potential of equation (14) is used, with a further constraint on the local displacement as compared to the previous iteration:

$$V_p^t(l_p) = \int_{\Omega_p} \rho(s(d^{l_p} + T^{t-1}(x)), t(x))dx \qquad (18)$$

Where $T^{t-1}(x)$ is the deformation transformation of the previous iteration.

According to a second embodiment, the unary potential of equation (15), similarly adapted to capture fine displacements from the previous iteration to the current iteration is used:

$$V_p^t(l_p, w_p) = \int_{\Omega_p} \rho'(s(d^{l_p} + T^{t-1}(x)), t(x), \gamma^{w_p}) dx \qquad (19)$$

Diffeomorphism deformations are guaranteed by restricting the maximum displacement to 0.4 times the control spacing.

The computed data terms are stored.

The smoothness terms $V_{pq}^t$ $(l_p, l_q)$ are then computed in following step 50, for all couples or cliques of control points as defined by the neighborhood N(G) are computed.

Next the LBP algorithm is applied in following step 60 to obtain the labels that optimize the MRF energy target function.

The grid of control points and the first and second sets of labels are then updated in step 70 for the next iteration, unless the maximum number of iterations to be performed has been reached.

After that, the process returns to step 20 previously described.

In a general view, the registration method of the invention, as exemplified by the embodiments described above comprises estimating a smooth deformation field that optimizes a similarity criterion between the source image and the target image using a Markov Random Field framework, the similarity criterion being computed on transform coefficients obtained by applying a sub-space hierarchical transform to the image samples of the target image and to image samples obtained from the source image.

It is to be understood that embodiments of the present invention can be implemented in various forms of programmable hardware, software, firmware, special purpose processes, or a combination thereof.

In one embodiment, the present invention can be implemented in software as an application program tangible embodied on a computer readable program storage device.

The application program can be uploaded to, and executed by, a machine comprising any suitable architecture.

In another embodiment, the present invention can be implemented in a hardware associated with a processing unit (scanner, ultrasound acquisition device, graphics processing units, FPGAs, etc.)

Figure 3:
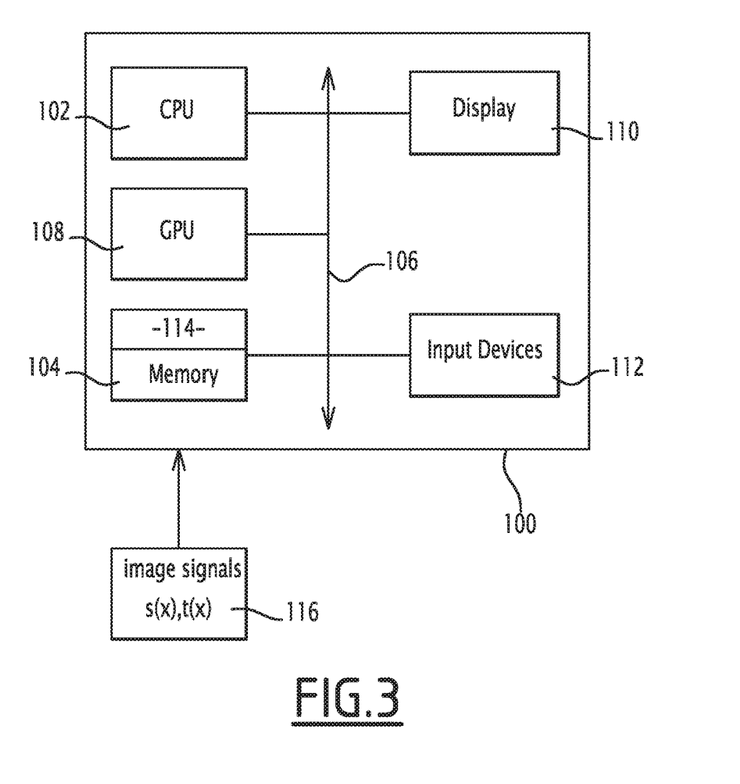
FIG. 3 is a block diagram of an exemplary computer system for elastic registration according to the invention.

FIG. 3 is a block diagram of an exemplary processing system for implementing a method for deformable fusion of a source multi-dimensional image and a target multi-dimensional image of an object, according to an embodiment of the invention.

Referring now to FIG. 3, a processing system 100 for implementing the present invention comprises, a central processing unit (CPU) 102, a memory 104, an input/output (I/O) interface 106 and a graphics processing unit 108. The processing system 100 is generally coupled through the I/O interface 106 to a display 110 and various input devices 112 such as a mouse, keyboard touch-pad screen and devices (running on different operating systems 10S, Android), gesture interpretation devices (kinect, range data).

The support circuits can include circuits such as cache, power supplies, clock circuits, and a communication bus. The memory 104 can include random access memory (RAM), read only memory (ROM), remote access hardware drive (conventional hard drive or cloud storage) accessible through direct connection, wired wireless ethernet or a combination thereof. The present invention can be implemented as a routine 114 that is stored in memory 104 and executed by the CPU 102 or by GPU 108 to process the signal from the source image 116. As such, the computer system 100 is a general purpose computer system that becomes a specific purpose processing system when executing the routine 114 of the present invention.

The processing system 100 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

In a variant, a routine 114 that is stored in memory 104 and executed by the CPU 102 or by GPU 108 to process the signal from the source image 116 is part of a medical processing programmed device, for example an echography device.

It is to be further understood that, because some of the constituent system components and method steps depicted in the accompanying figures can be implemented in software, the actual connections between the systems components (or the process steps) may differ depending upon the manner in which the present invention is programmed.

Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

Advantageously, the method of the invention achieves near real-time performance. In particular when the step of obtaining a set of labels optimizing an energy target function is implemented using a variant loopy belief propagation algorithm, applied within modern parallel programmable architectures, near real-time performance is achieved.

The method of the invention was tested on a graphical processing unit, (model: Nvidia Geforce 480 GTX) having 480 cores and a theoretical bandwidth of 177.4 GB/s. The registration of MR-T1, MR-T2 and CT images of size 256×192×64 using the proposed method with 3 levels and 5 iterations took 2 seconds when calculating non-linearity correction factors before the optimization phase and 4 seconds when non-linearity factors are computed by optimizing the full model.

Advantageously, the similarity metric computation complexity benefits greatly from implementations on GPU architectures.

Advantageously, the proposed similarity metric captures spatial information present at multiples scales in the images using wavelet coefficients and compensates for local non-linear variations in intensity.

The invention claimed is:

1. A method for deformable fusion of a source multi-dimensional image and a target multi-dimensional image of an object, each image being defined on a multi-dimensional domain by a plurality of image signal samples, each sample having an associate position in the multi-dimensional domain and an intensity value, the method comprising:

estimating a smooth deformation field that optimizes a similarity criterion between the source image and the target image using a Markov Random Field framework, in near real-time performance, wherein the similarity criterion is computed using a similarity metric applied on transform coefficients obtained by applying a sub-space hierarchical transform to the image samples of the target image and to image samples obtained from the source image, wherein an optimal tradeoff between a smoothness condition and the similarity criterion is automatically determined, defining a Markov Random Field framework comprising an undirected pairwise graph superimposed on the image domain defining a grid of control points, and an associate neighborhood system, each control point having an associate support sub-domain, obtaining a set of multi-dimensional labels of a discrete space to associate to each control point, wherein a displaced control point is obtained by assigning a given label to said control point, obtaining a set of labels optimizing an energy target function, the energy target function comprising a first data term computed as a sum, over the control points, of unary potentials depending on the similarity metric computed using transform coefficients of the target image and transform coefficients of displaced points of the source image, wherein the similarity metric is computed, for each control point, on the support sub-domain associated to the control point, as a sum of a difference, on each point of the support sub-domain, between the logarithm of the transform coefficient of the displaced source image and the logarithm of the transform coefficient of the target image and a constant value.

2. The method according to claim 1, wherein the energy target function is a sum of said first data term and a second smoothness term, said smoothness term being dependent on a distance computed between displaced control points, according to a predetermined neighborhood.

3. The method according to claim 1, wherein the obtaining a set of labels optimizing an energy target function is implemented using a variant loopy belief propagation algorithm.

4. The method according to claim 1, wherein the sub-space hierarchical transform is a discrete Haar wavelet transform.

5. A programmable device for deformable fusion of a source multi-dimensional image and a target multi-dimensional image of an object, each image being defined on a multi-dimensional domain by a plurality of image signal samples, each sample having an associate position in the multi-dimensional domain and an intensity value, the deformable fusion comprising estimating a smooth deformation field that optimizes a similarity criterion between the source image and the target image using a Markov Random Field framework, in near real-time performance, comprising a processor that computes the similarity criterion using a similarity metric applied on transform coefficients obtained by applying a sub-space hierarchical transform to the image samples of the target image and to image samples obtained from the source image, so as to automatically determine an optimal tradeoff between a smoothness condition and the similarity criterion, wherein the processor is configured to:

define a Markov Random Field framework comprising an undirected pairwise graph superimposed on the image domain defining a grid of control points, and an associate neighborhood system, each control point having an associate support sub-domain, obtain a set of multi-dimensional labels of a discrete space to associate to each control point, wherein a displaced control point is obtained by assigning a given label to said control point, obtain a set of labels optimizing an energy target function, the energy target function comprising a first data term computed as a sum, over the control points, of unary potentials depending on said similarity metric computed using transform coefficients of the target image and transform coefficients of displaced points of the source image, wherein the similarity metric is computed, for each control point, on the support sub-domain associated to the control point, as a sum of a difference, on each point of the support sub-domain, between the logarithm of the transform coefficient of the displaced source image and the logarithm of the transform coefficient of the target image and a constant value.

6. The device of claim 5, wherein the energy target function is a sum of said first data term and a second smoothness term, said smoothness term being dependent on a distance computed between displaced control points, according to a predetermined neighborhood.

7. The device of claim 5, wherein the obtaining a set of labels optimizing an energy target function is implemented using a variant loopy belief propagation algorithm.

8. The device of claim 5, wherein the sub-space hierarchical transform is a discrete Haar wavelet transform.

9. A non-transitory program storage device readable by a processing system, tangibly embodying a program of instructions executed by the processing system to perform a method for deformable fusion of a source multi-dimensional image and a target multi-dimensional image of an object wherein each image is defined on a multi-dimensional domain by a plurality of image signal samples, each sample having an associate position in the multi-dimensional domain and an intensity value, the method comprising:

estimating a smooth deformation field that optimizes a similarity criterion between the source image and the target image using a Markov Random Field framework, in near real-time performance, and wherein the similarity criterion is computed using a similarity metric applied on transform coefficients obtained by applying a sub-space hierarchical transform to the image samples of the target image and to image samples obtained from the source image, wherein an optimal tradeoff between a smoothness condition and the similarity criterion is automatically determined, defining a Markov Random Field framework comprising an undirected pairwise graph superimposed on the image domain defining a grid of control points, and an associate neighborhood system, each control point having an associate support sub-domain, obtaining a set of multi-dimensional labels of a discrete space to associate to each control point, wherein a displaced control point is obtained by assigning a given label to said control point, obtaining a set of labels optimizing an energy target function, the energy target function comprising a first data term computed as a sum, over the control points, of unary potentials depending on the similarity metric computed using transform coefficients of the target image and transform coefficients of displaced points of the source image, the similarity metric being computed, for each control point, on the support sub-domain associated to the control point, as a sum of a difference, on each point of the support sub-domain, between the logarithm of the transform coefficient of the displaced source image and the logarithm of the transform coefficient of the target image and a constant value.

10. A method for deformable fusion of a source multi-dimensional image and a target multi-dimensional image of an object, each image being defined on a multi-dimensional domain by a plurality of image signal samples, each sample having an associate position in the multi-dimensional domain and an intensity value, the method comprising:
  estimating a smooth deformation field that optimizes a similarity criterion between the source image and the target image using a Markov Random Field framework, in near real-time performance, wherein the similarity criterion is computed using a similarity metric applied on transform coefficients obtained by applying a sub-space hierarchical transform to the image samples of the target image and to image samples obtained from the source image, wherein an optimal tradeoff between a smoothness condition and the similarity criterion is automatically determined,
  defining a Markov Random Field framework comprising an undirected pairwise graph superimposed on the image domain defining a grid of control points, and an associate neighborhood system, each control point having an associate support sub-domain,
  obtaining a set of multi-dimensional labels of a discrete space to associate to each control point, wherein a displaced control point is obtained by assigning a given label to said control point,
  obtaining a set of labels optimizing an energy target function, the energy target function comprising a first data term computed as a sum, over the control points, of unary potentials depending on the similarity metric computed using transform coefficients of the target image and transform coefficients of displaced points of the source image,
  wherein the similarity metric is computed, for each control point, on the support sub-domain associated to the control point, as a sum of a difference, on each point of the support sub-domain, between the logarithm of the transform coefficient of the displaced source image weighted by a non-linear exponential constant value and the logarithm of the transform coefficient of the target image, and a constant value.

11. The method according to claim 10, wherein the energy target function is a sum of said first data term and a second smoothness term, said smoothness term being dependent on a distance computed between displaced control points, according to a predetermined neighborhood.

12. The method according to claim 10, wherein the obtaining a set of labels optimizing an energy target function is implemented using a variant loopy belief propagation algorithm.

13. The method according to claim 10, wherein the sub-space hierarchical transform is a discrete Haar wavelet transform.

14. A programmable device for deformable fusion of a source multi-dimensional image and a target multi-dimensional image of an object, each image being defined on a multi-dimensional domain by a plurality of image signal samples, each sample having an associate position in the multi-dimensional domain and an intensity value, the deformable fusion comprising estimating a smooth deformation field that optimizes a similarity criterion between the source image and the target image using a Markov Random Field framework, in near real-time performance,
  comprising a processor that computes the similarity criterion using a similarity metric applied on transform coefficients obtained by applying a sub-space hierarchical transform to the image samples of the target image and to image samples obtained from the source image, so as to automatically determine an optimal tradeoff between a smoothness condition and the similarity criterion, wherein the processor is configured to:
    define a Markov Random Field framework comprising an undirected pairwise graph superimposed on the image domain defining a grid of control points, and an associate neighborhood system, each control point having an associate support sub-domain,
    obtain a set of multi-dimensional labels of a discrete space to associate to each control point, wherein a displaced control point is obtained by assigning a given label to said control point,
    obtain a set of labels optimizing an energy target function, the energy target function comprising a first data term computed as a sum, over the control points, of unary potentials depending on said similarity metric computed using transform coefficients of the target image and transform coefficients of displaced points of the source image,
  wherein the similarity metric is computed, for each control point, on the support sub-domain associated to the control point, as a sum of a difference, on each point of the support sub-domain, between the logarithm of the transform coefficient of the displaced source image weighted by a non-linear exponential constant value and the logarithm of the transform coefficient of the target image, and a constant value.

15. The device of claim 14, wherein the energy target function is a sum of said first data term and a second smoothness term, said smoothness term being dependent on a distance computed between displaced control points, according to a predetermined neighborhood.

16. The device of claim 14, wherein the obtaining a set of labels optimizing an energy target function is implemented using a variant loopy belief propagation algorithm.

17. The device of claim 14, wherein the sub-space hierarchical transform is a discrete Haar wavelet transform.

* * * * *